(12) United States Patent
Davis (10) Patent No.: US 12,339,472 B2
(45) Date of Patent: Jun. 24, 2025

(54) CONCAVE POLYGONAL APERTURE CORNERCUBE PRISMS AND METHODS THEREOF

(71) Applicant: ORAFOL AMERICAS INC., Avon, CT (US)

(72) Inventor: Arthur J. Davis, Schaghticoke, NY (US)

(73) Assignee: ORAFOL AMERICAS INC., Avon, CT (US)

( * ) Notice: Subject to any disclaimer, the term of this patent is extended or adjusted under 35 U.S.C. 154(b) by 531 days.

(21) Appl. No.: 17/514,934

(22) Filed: Oct. 29, 2021

(65) Prior Publication Data

US 2023/0137758 A1 May 4, 2023

(51) Int. Cl.
*G02B 5/124* (2006.01)

(52) U.S. Cl.
CPC .................................. *G02B 5/124* (2013.01)

(58) Field of Classification Search
None
See application file for complete search history.

(56) References Cited

U.S. PATENT DOCUMENTS

| 6,015,214 | A | 1/2000 | Heenan et al. | |
| 6,626,544 | B2 * | 9/2003 | Lu | G02B 5/124 |
| | | | | 359/530 |
| 7,506,987 | B2 * | 3/2009 | Nilsen | G02B 5/124 |
| | | | | 359/530 |
| 2019/0079223 | A1 | 3/2019 | Scott et al. | |

OTHER PUBLICATIONS

International Search Report and Written Opinion of the International Searching Authority, dated Jan. 31, 2022.

* cited by examiner

*Primary Examiner* — Euncha P Cherry
(74) *Attorney, Agent, or Firm* — Troutman Pepper Locke LLP (57) ABSTRACT

A retroreflector structure with a plurality of cornercube prisms in a sheet and a projected aperture of at least one of the cornercube prisms has a concave polygon shape with at least one interior angle greater than 180°.

30 Claims, 10 Drawing Sheets

Example chevron cube with 5° tilt.

Figure 1: Prism feature definitions.

Figure 2: chevron individual prism geometry.

Figure 3: Truncated Cube active area.

Figure 4: Rectangular Cube active area.

Figure 5: Chevron Cube active area.

Figure 6: Stretched Chevron Cube active area.

*Figure 7: Comparison of active areas of representative prism types "up" prism.*

*Figure 8: Comparison of active areas of representative prism types with active areas of up and down prisms averaged.*

Figure 9: Bidirectional chevron tiling.

Figure 10: Unidirectional chevron tiling.

Figure 11: Example of mixed unidirectional and bidirectional chevron tiling.

Figure 12: Example chevron cube with 5° tilt.

Figure 13: Example chevron Cube with 12° tilt.

Figure 14: Unidirectional chevron cube tiling with 0° tilt and off-center apex point.

Figure 15: Schematic demonstrating compound tilt angle.

Figure 16: Example chevron cube tiling with compound tilt angle.

Figure 17: 0/90 in-situ tiling.

Figure 18: 0/90 parquet tiling.

10(10)-

Figure 19. 0/90 in-situ tiling AND parquet tiling.

10(11)-

Figure 20. Example parquet tiling with varying orientation angles.

Figure 21: Example parquet tiling using chevron cubes with different tilts.

Figure 22: Example in-situ multi-tilt prism tiling where prism tilt is adjusted within the tile.

CONCAVE POLYGONAL APERTURE CORNERCUBE PRISMS AND METHODS THEREOF

FIELD

This technology generally relates to cornercube prisms and, more particularly, to retroreflecting prisms with a concave polygon projected aperture shape and methods thereof.

BACKGROUND

Retroreflective materials are designed to reflect incident radiation back toward or nearly back toward a source emitter regardless of an angle of incidence. Triangular and rectangular cornercube retroreflectors are the most common retroreflective technologies for high performance applications in the current state of the art.

A projected aperture shape for all known cornercube prism types that are commercially available or described in the literature are convex polygons (that is all interior angles of a projected aperture polygon are less than 180°). For instance: triangular, rectangular and hexagonal.

Figure 1:
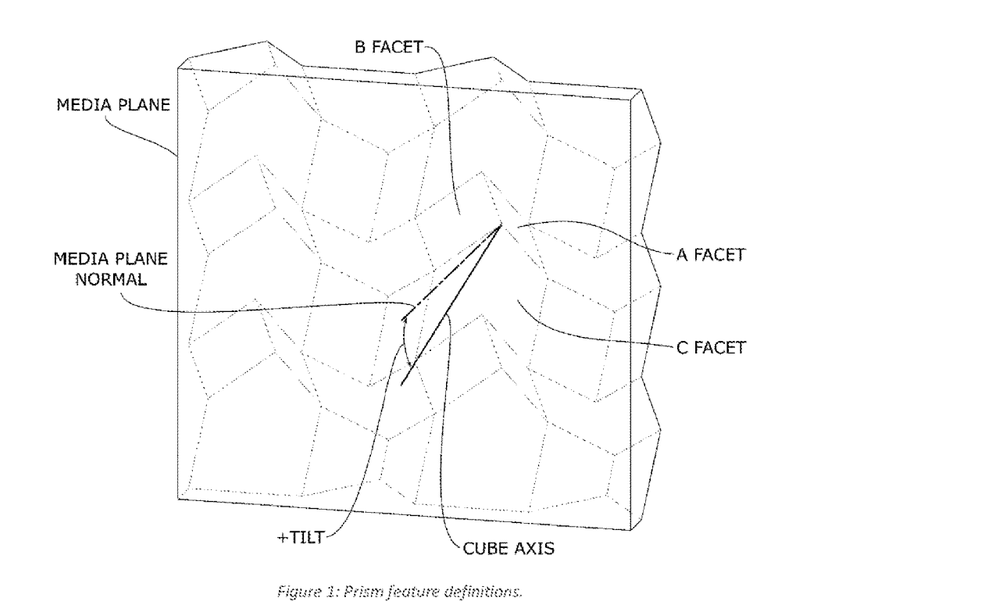
FIG. 1 is a perspective view of a prism illustrating exemplary definitions for A, B, and C facets and tilt as an angle between a normal to a plane of an optical media and a cube axis.

Prism tilt (also known as cant) is described by way of example in U.S. Pat. No. 3,923,378 to Heenan and U.S. Pat. No. 4,588,258 to Hoopman which are each herein incorporated by reference in their entirety. The "cube axis" is defined as the axis coincident with the cube apex about which all three prism facet planes are symmetrically arranged. With reference to FIG. 1, the tilt is the angle between the normal to the plane of the optical media and the cube axis. The convention adopted is that positive tilt corresponds to a prism rotation in which the "C" facet becomes more parallel with the plane of the optical material.

SUMMARY

A retroreflector structure with a plurality of cornercube prisms in a sheet and a projected aperture of at least one of the cornercube prisms has a concave polygon shape with at least one interior angle greater than 180°.

A method for making a retroreflector structure includes providing a sheet for the retroreflector structure. A plurality of cornercube prisms are formed in the sheet with at least one of the cornercube prisms having a projected aperture formed to have a concave polygon shape with at least one interior angle greater than 180°.

Examples of this technology provide a number of advantages including providing improved and customizable retroreflective structures. With example of this technology, a projected polygonal aperture shapes of at least one of the prisms is concave with at least one interior angle of the projected aperture polygon being greater than 180°. Additionally, examples of this technology may advantageously be configured with different: shapes, such as truncated cubes, rectangular cubes, chevron cubes, or stretched chevron cubes; sizes, such as between 25 µm to 500 µm; directions, such as unidirectional, bidirectional, or a combination thereof; tilts, such as over the range of −20° to +20°; apex center locations; and/or tiling, such as in-situ, parquet, or a combination thereof to further customize optical retroreflective performance. Further still each individual prism in an ensemble of prisms may have a uniquely prescribed tilt providing an added degree of freedom for achieving a target aggregated photometric performance.

DETAILED DESCRIPTION

Various examples of sheets of retroreflective structures 10(1)-10(13) with prisms with a projected aperture having a concave polygonal shape with at least one interior angle greater than 180° are illustrated in FIGS. 9-14 and 16-22. In these examples, the sheets of retroreflective structures 10(1)-

10(13) have prisms with different: shapes, such as truncated cubes, rectangular cubes, chevron cubes, or stretched chevron cubes; sizes, such as between 25 µm to 500 µm; directions, such as unidirectional, bidirectional, or a combination thereof; tilts, such as over the range of −20° to +20°; apex center locations; and/or tiling, such as in-situ, parquet, or a combination thereof. Examples of this technology provide a number of advantages including providing improved and customizable retroreflective structures.

Figure 2:
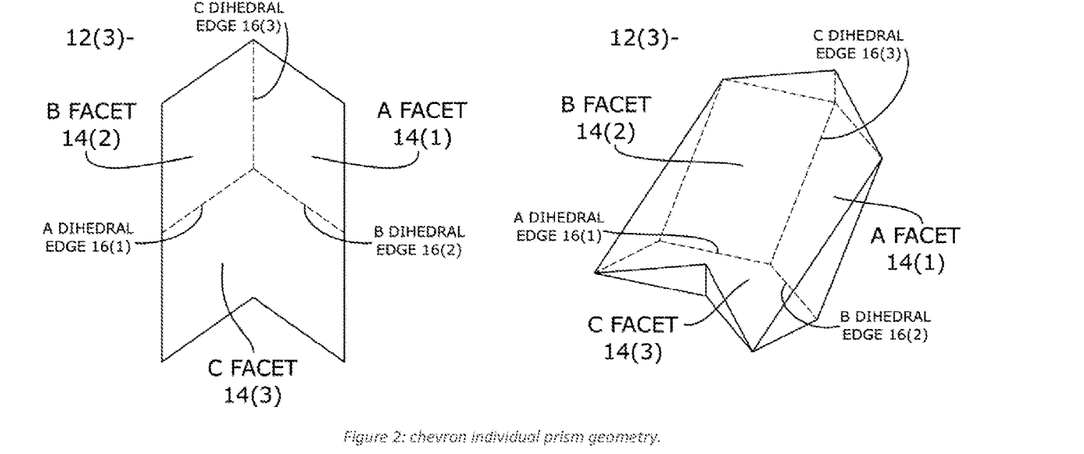
FIG. 2 are perspective views of an exemplary prism with a chevron geometry in a sheet of a retroreflective structure.
Figure 3:
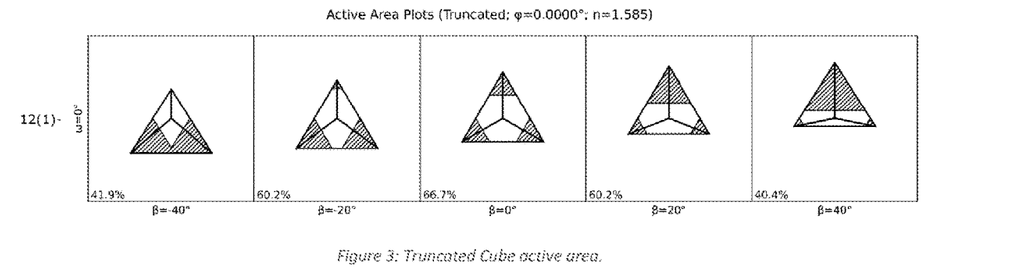
FIG. 3 are diagrams of active area plots for an exemplary truncated cube at different entrance angles.
Figure 4:
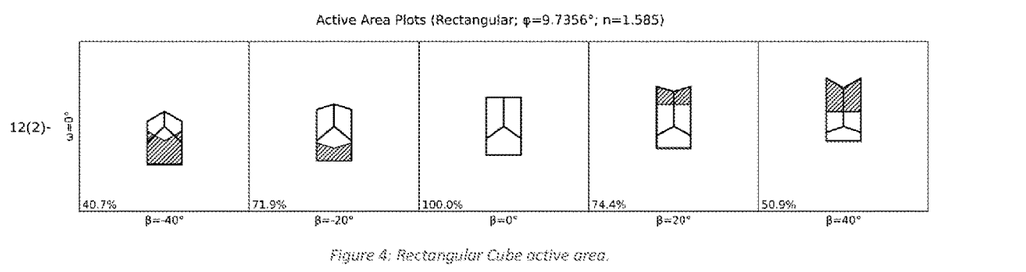
FIG. 4 are diagrams of active area plots for an exemplary rectangular cube at different entrance angles.

Referring more specifically to FIG. 2, diagrams of an example of a cornercube prism 12(3) having a projected polygonal aperture that is a concave polygonal shape that resembles a chevron with at least one interior angle greater than 180° are illustrated. In this example, the cornercube prism 12(3) has a cube axis with a +9.8° of tilt with respect to a normal of a plane extending along a sheet in which the cornercube prism is located, although the cornercube prism could have other shapes and/or other tilts, such as between a −20° to +20° of tilt by way of example.

Additionally, in this example the cornercube prism 12(3) has A, B and C facets 14(1)-14(3) and A, B. and C dihedral edges 16(1)-16(3). A dihedral angle deviation (DAD) is how much each of the A, B and C facets 14(1)-14(3) deviates from a perfect 90° internal angle from an adjacent one of the A, B and C facets 14(1)-14(3). Thus, the cornercube prism 12(3) has three DADs identified for A, B and C facets 14(1)-14(3). Additionally, examples of this technology may have each individual prism in an ensemble of prisms on a sheet of a retroreflective structure each having DADs of facets of each prism adjusted, such that the aggregated photometric performance achieves a specified design target as illustrated and described by way of the examples herein and as disclosed by way of example in Table 1 of column 5 of U.S. Pat. No. 5,138,488 to Szczech which is hereby incorporated by reference in its entirety.

As is discussed by way of example in U.S. Pat. No. 4,588,258 to Hoopman, adjusting a tilt angle will change an entrance angle for which peak brightness is achieved. Examples of this technology, utilize this adjustment with further dynamic customized alterations to optimize effective geometric active area in each of the prisms in sheets of exemplary retroreflective structures 10(1)-10(13).

In these examples, the triple reflection ray path that defines retroreflection determines how much light energy will be available for distribution into a specific targeted photometric performance. If every entrance ray successfully maps to a three-bounce retroreflected exit ray then the prism has 100% active area. For every entrance ray that fails to retroreflect due to missing a facet (or failing total internal reflection (TIR) as may happen with an air-backed retroreflector) as part of its ray path the active area will be reduced. Accordingly, examples of the claimed technology define active area (Aa) as:

$$A_a = \frac{A_i}{A_0}$$

where $A_0$ is the projected prism entrance aperture area and $A_i$ is the effective area of the facets of a prism that will support a three-bounce retroreflection.

Figure 5:
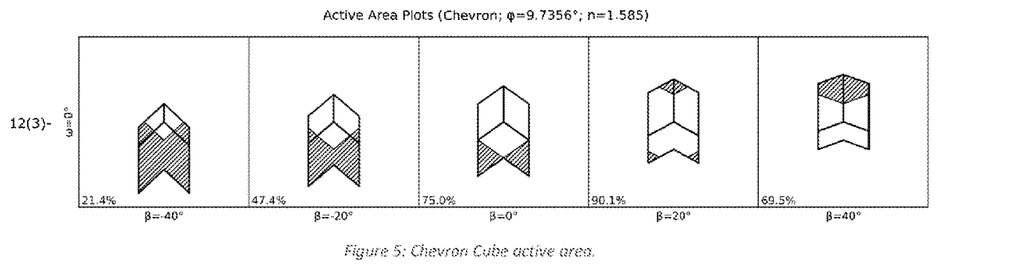
FIG. 5 are diagrams of active area plots for an exemplary chevron cube at different entrance angles.
Figure 6:
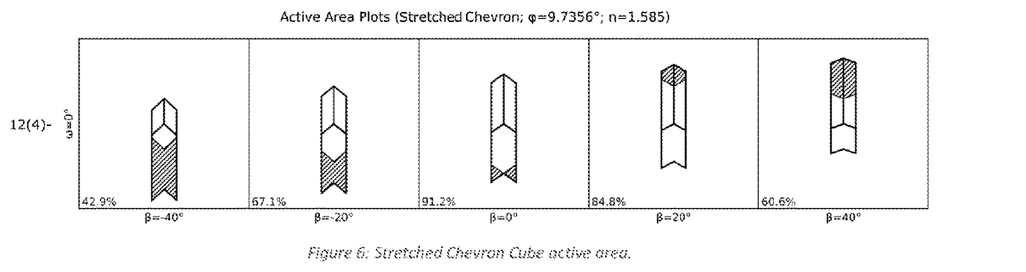
FIG. 6 are diagrams of active area plots for an exemplary stretched chevron cube at different entrance angles.
Figure 7:
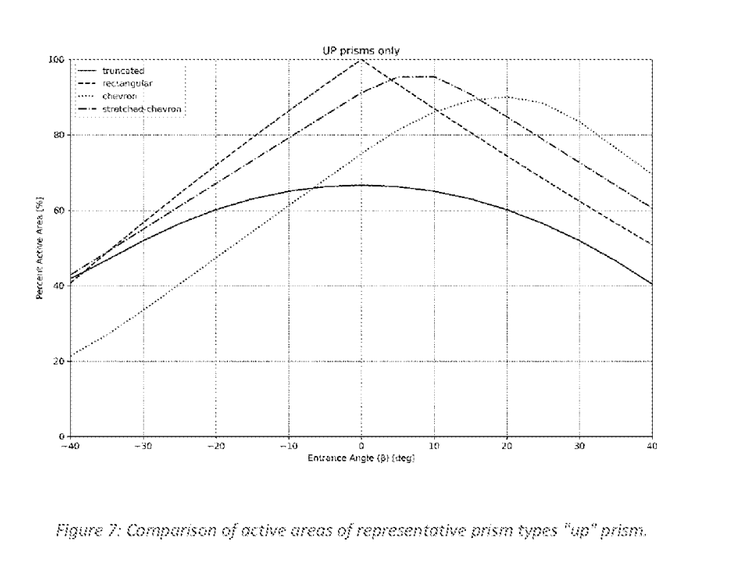
FIG. 7 is a graph of an exemplary comparison of active areas of truncated cubes, rectangular cubes, chevron cubes, and stretched chevron cubes each arranged in a first orientation.
Figure 8:
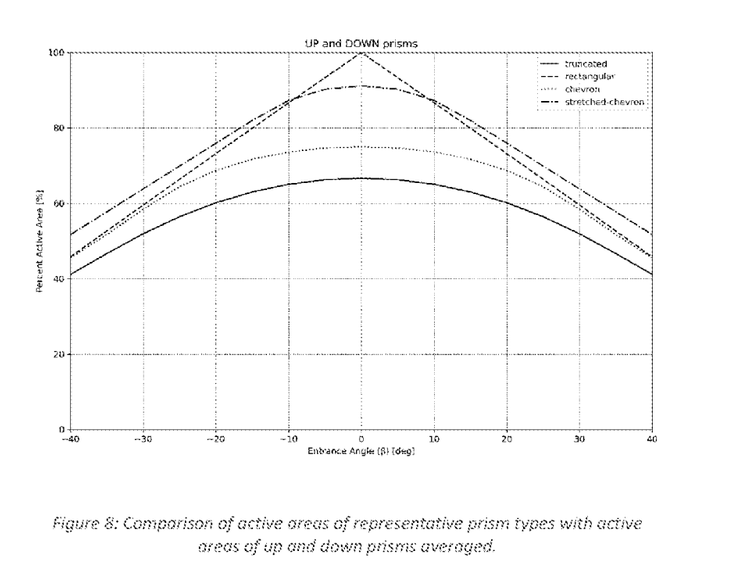
FIG. 8 is a graph of an exemplary comparison of active areas of truncated cubes, rectangular cubes, chevron cubes, and stretched chevron cubes each arranged in alternating orientations.

Referring to FIGS. 3-6, active areas of various examples of different shaped cornercube prisms 12(1)-12(4) at entrance angles β of −40°, −20°, 0°, +20°, and +40° are shown. In each plot, the projected aperture at the noted entrance angle is illustrated and a region that supports retroreflection is illustrated as being unobscured whereas a region that does not support retroreflection is illustrated with shading. These examples illustrate how prisms 12(1)-12(4) appear under different illumination conditions. Referring to FIGS. 7-8, graphs of active area versus entrance angles for each of the examples of different shaped cornercube prisms 12(1)-12(4) are shown. Accordingly, as illustrated by these examples prisms in sheets of examples of retroreflective structures 10(1)-10(13) can have aspects, such as shape and/or tilt adjusted by way of example, to customize photometric performance as needed for a particular application.

As illustrated in FIGS. 3, 5, and 7-8, a significant advantage is demonstrated for a chevron cube shaped prism 12(3) vs. a truncated cube shaped prism 12(1). Additionally, as illustrated in FIGS. 4, 5, and 7-8, as entrance angle is increased a chevron cube prism 12(3) and a rectangular cube shaped prism 12(2) become very similar in available active area. Further, as illustrated in FIGS. 6-8, chevron cube active area may be further increased to converge towards the active area characteristics of rectangular cube by "stretching" the aperture as shown in prism 12(4). In this example, the C facet 14(3) of prism 12(3) is elongated with respect to A and B facets 14(1) and 14(2). In this configuration in prism 12(4), the inactive optical area consumes less of a portion of the total prism area thereby increasing the overall active area as shown in FIG. 6.

Figure 9:
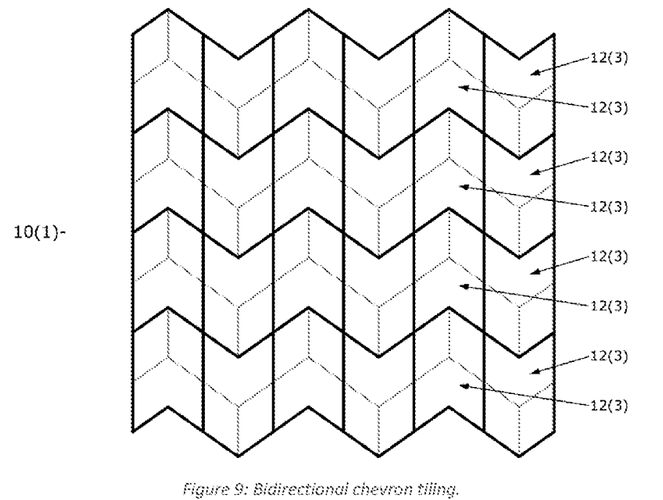
FIG. 9 is a diagram of an exemplary sheet of a retroreflective structure arranged with bi-directional chevron tiling.
Figure 10:
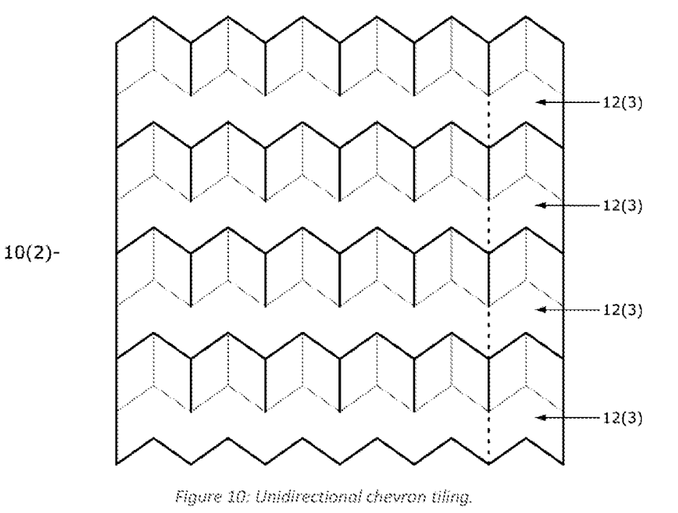
FIG. 10 is a diagram of an exemplary sheet of a retroreflective structure with unidirectional chevron tiling.
Figure 11:
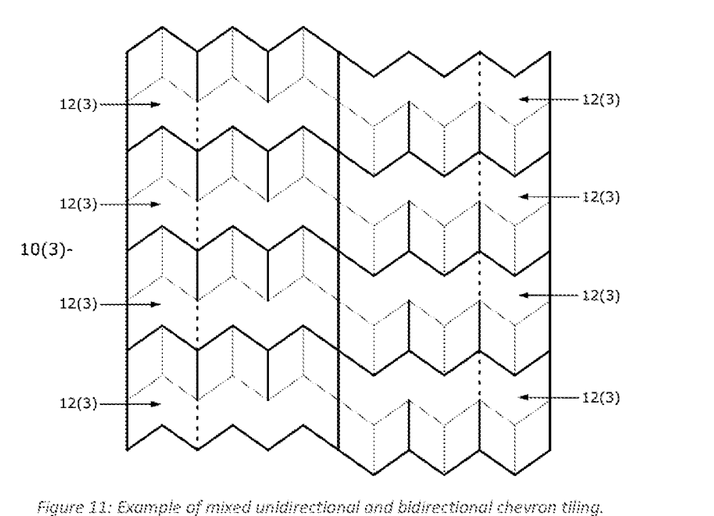
FIG. 11 is a diagram of an exemplary sheet of a retroreflective structure with mixed unidirectional and bi-directional chevron tiling.

Referring to FIGS. 9-11, exemplary sheets of a retroreflective structures 10(1)-10(3) arranged with different directional chevron tiling are illustrated, although one or more of these retroreflective structures may have one or more cornercube prisms with other selected shapes, such as those shown in FIGS. 3-6 by way of example, to customize to a particular photometric performance. In these examples, the retroreflective structures 10(1)-10(3) utilize cornercube prisms 12(3) which have a chevron shaped projected aperture. These cornercube prisms 12(3) which have a chevron shaped projected aperture have the property that they may be perfectly tiled either bidirectionally as shown in FIG. 9 or unidirectionally as shown in FIG. 10. In the bidirectional configuration for the exemplary sheet of the retroreflective structure 10(1) shown in FIG. 9, every cornercube prism 12(3) with an "up chevron" shaped projected aperture is paired with another adjacent 180° relatively rotated cornercube prism 12(3) with a "down chevron" shaped projected aperture. In the unidirectional configuration for the exemplary sheet of the retroreflective structure 10(2) shown in FIG. 10, all the cornercube prisms 12(3) with a chevron shaped projected aperture are oriented in the same direction. Referring to FIG. 11, an exemplary sheet of a retroreflective structure 10(3) with mixed unidirectional and bi-directional configurations of cornercube prisms 12(3) with chevron shaped projected aperture chevron tiling which can yield incrementally improved active area due to adjacent continuity of the C facets 14(3) is illustrated, although other configurations of mixing unidirectional and bi-directional configurations of cornercube prisms 12(3) may be used.

In the unidirectional configuration for the exemplary sheet of the retroreflective structure 10(2) shown in FIG. 10, prims having a chevron cube shape as shown in FIG. 5 have a great advantage for high entrance angles as shown in FIG. 7. To make the prism sheeting orientation agnostic, bidirectional or pseudo-bidirectional prism sheeting, such as the exemplary sheet of the retroreflective structure 10(3) shown in FIG. 11, may be manufactured for which the effective active area is as shown in FIG. 8.

An advantageous geometry chevron shape in examples of this technology occurs when the prism tilt equals:

$\phi = 45° - \tan^{-1}(\sqrt{2}/2)$ which evaluates to: $\phi = 9.7361$.

Figure 12:
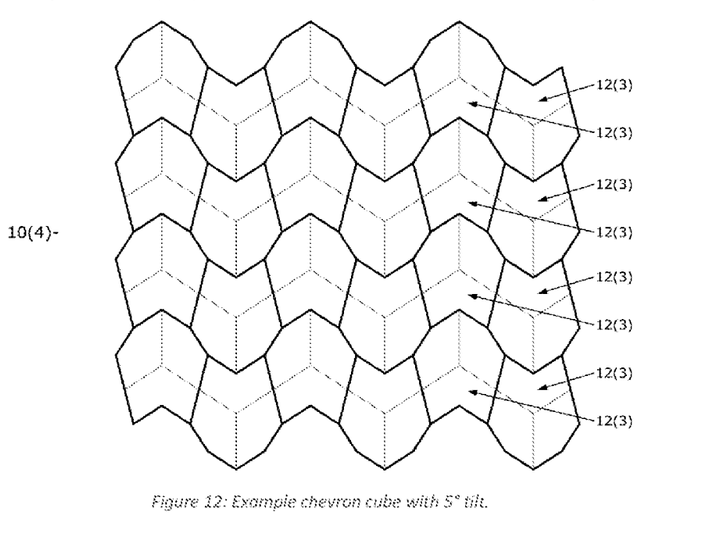
FIG. 12 is a diagram of an exemplary sheet of a retroreflective structure with cornercube prisms each comprising a chevron cube with a 5° tilt.
Figure 13:
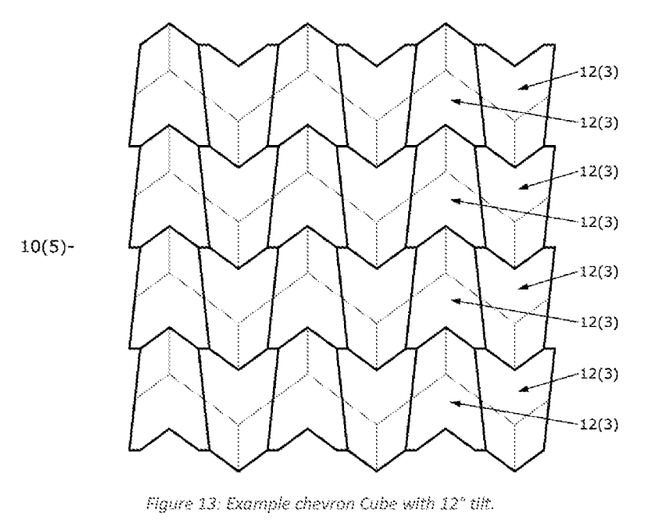
FIG. 13 is a diagram of an exemplary sheet of a retroreflective structure with cornercube prisms each comprising a chevron cube with a 12° tilt.

By adjusting the tilt, various other chevron aperture shapes emerge with different photometric performance properties. By way of example, tilt may be less than 9.7°, for example 5° for each prism 12(3) in a sheet of a retroreflective structure 10(4) as shown in FIG. 12 or greater than 9.7°, for example 12° for each prism 12(3) in a sheet of a retroreflective structure 10(5) as shown in FIG. 13. In examples of this technology, tilt angles of optical axes of prism in sheets of retroreflective structures will typically be in the range of −20° to +20° to obtain one more desired photometric performance properties.

Figure 14:
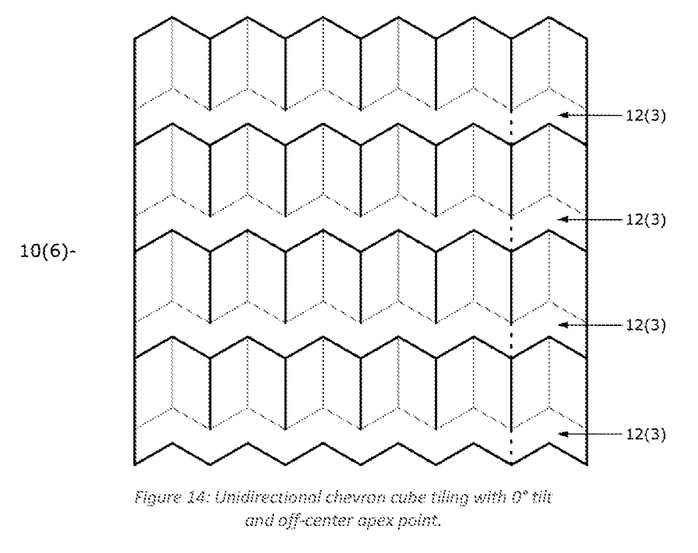
FIG. 14 is a diagram of an exemplary sheet of a retroreflective structure with unidirectional chevron tiling with 0° tilt and an off-center apex point.

In other example of this technology, tilt of prisms may be adjusted (or may be zero) while maintaining a pure chevron aperture shape by offsetting a cube apex location of each prism for unidirectional tiling as illustrated in the sheet of a retroreflective structure 10(6) shown in FIG. 14. In this example, moving the cube apex location of each prism from center will cause peak active area to be achieved at a non-zero entrance angle. This way performance can again be tuned in another manner to be maximized about a regime of positive or negative entrance angles.

Figure 15:
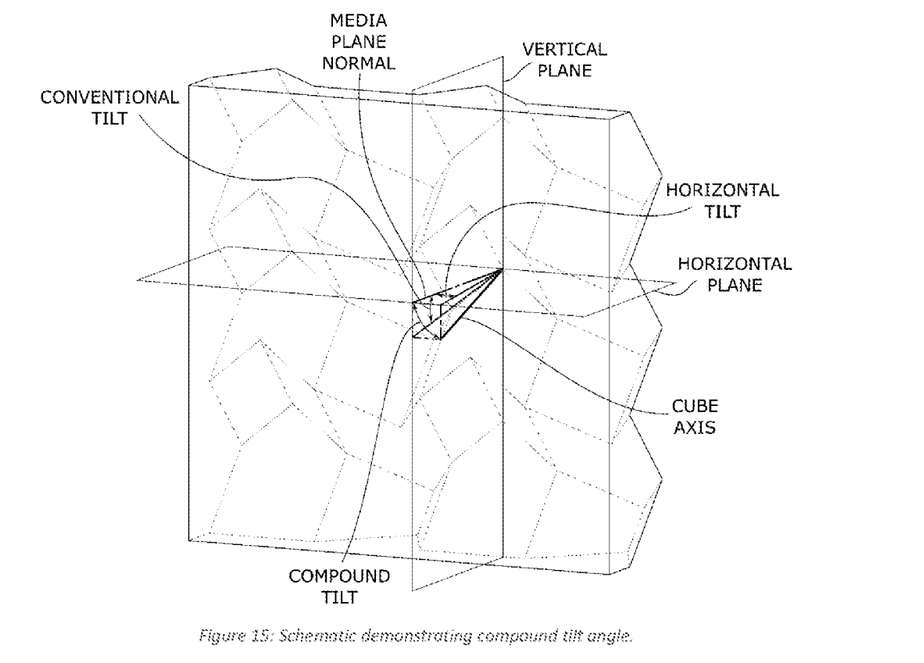
FIG. 15 is a perspective view of an exemplary prism illustrating a compound tilt angle.
Figure 16:
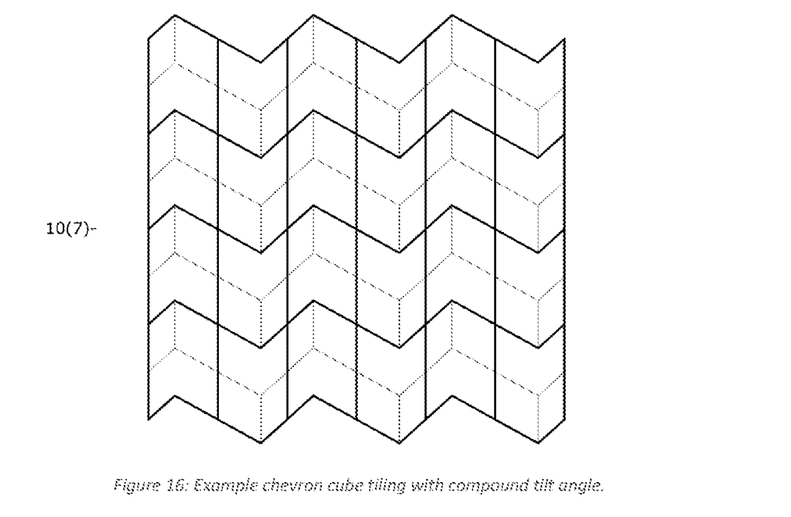
FIG. 16 is a diagram of an exemplary sheet of a retroreflective structure with chevron cube tiling with a compound tilt angle.

In other examples of this technology, tilt of retroreflective structures need not only be applied in the conventional vertical direction as shown by way of example in retroreflective structures 10(4) and 10(5), but in other examples either additionally or exclusively may customize a retroreflective structure 10(7) by applying a deviation to the cube axis in the horizontal plane so that a compound tilt angle is realized as shown in FIGS. 15-16. In example of this technology, compound tilt angles for retroreflective applications may be customized to be between a range of −20° to +20° to achieve one or more desired photometric properties.

Figure 17:
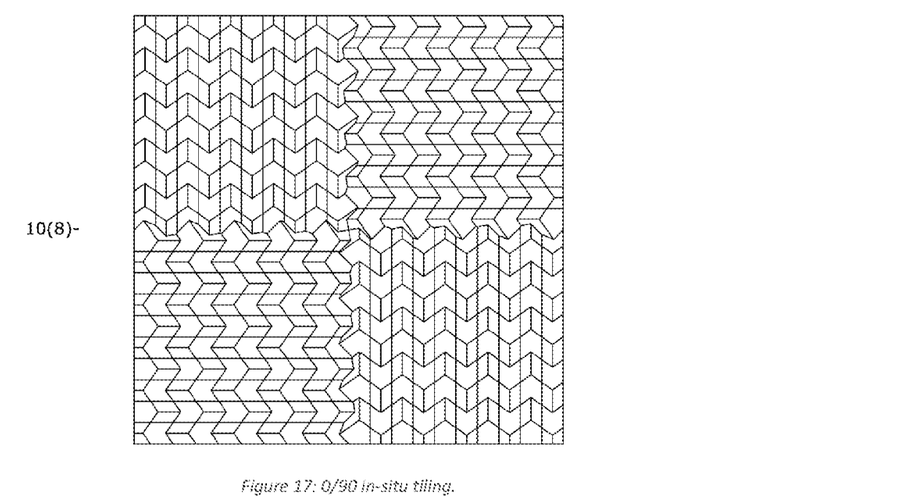
FIG. 17 is a diagram of an exemplary sheet of a retroreflective structure with 0/90 in-situ tiling.
Figure 18:
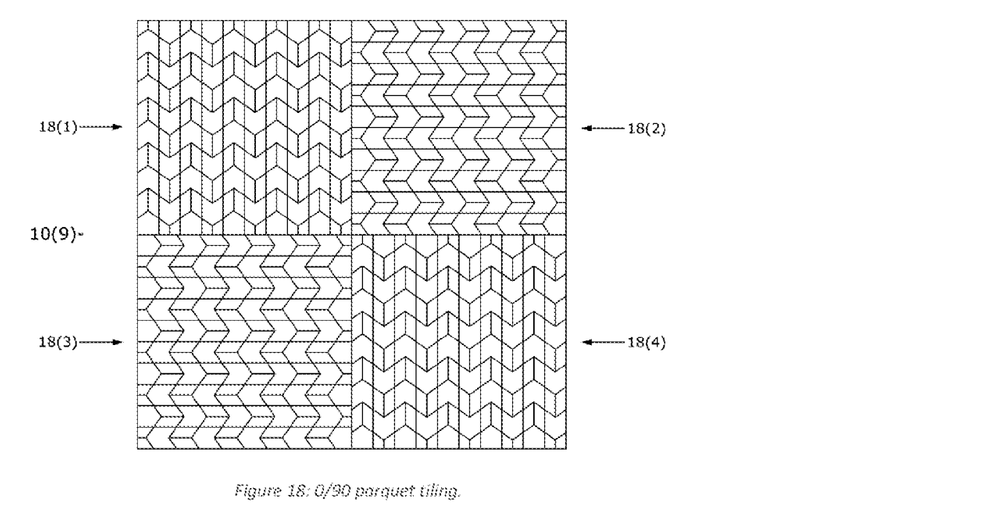
FIG. 18 is a diagram of an exemplary sheet of a retroreflective structure with 0/90 parquet tiling.
Figure 19:
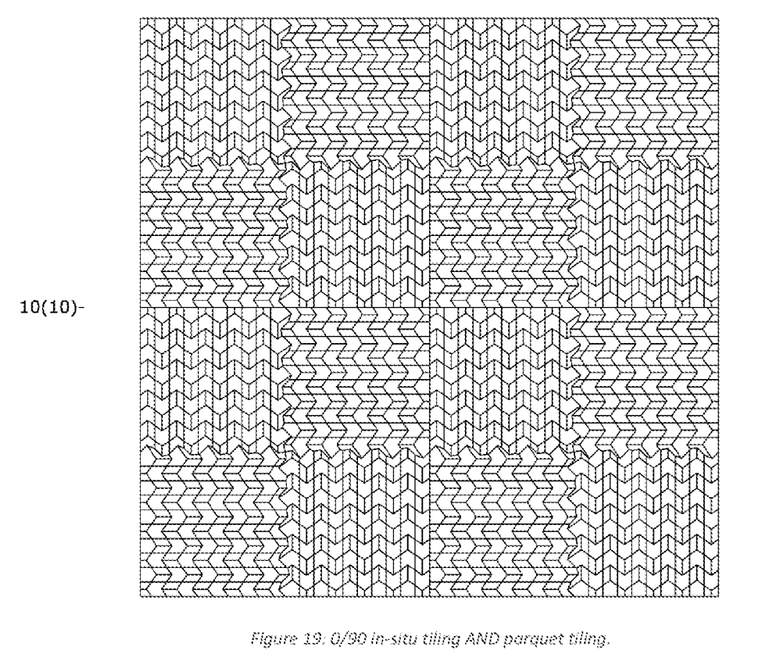
FIG. 19 is a diagram of an exemplary sheet of a retroreflective structure with 0/90 in-situ tiling and parquet tiling.
Figure 20:
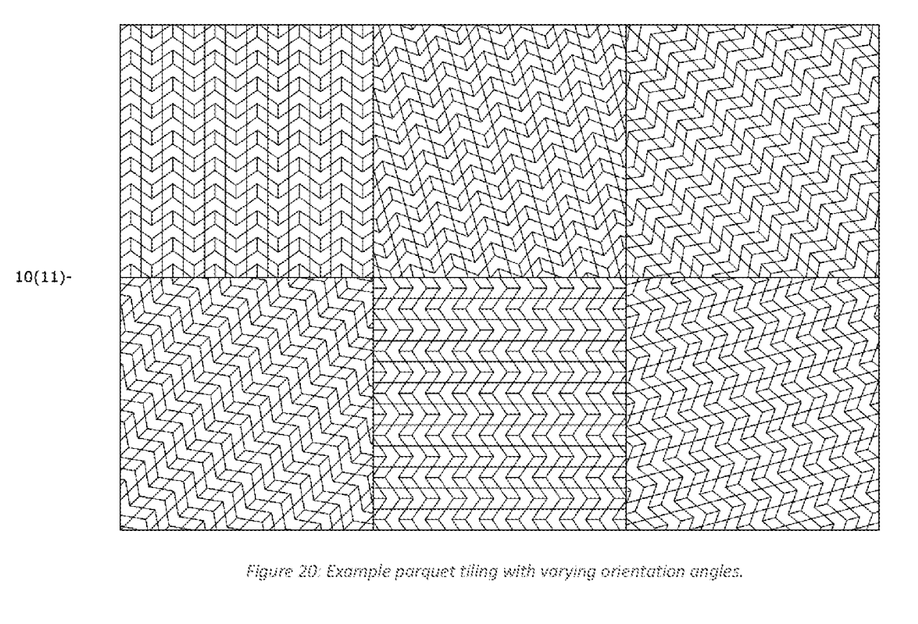
FIG. 20 is a diagram of an exemplary sheet of a retroreflective structure with parquet tiling with varying orientation angles.
Figure 21:
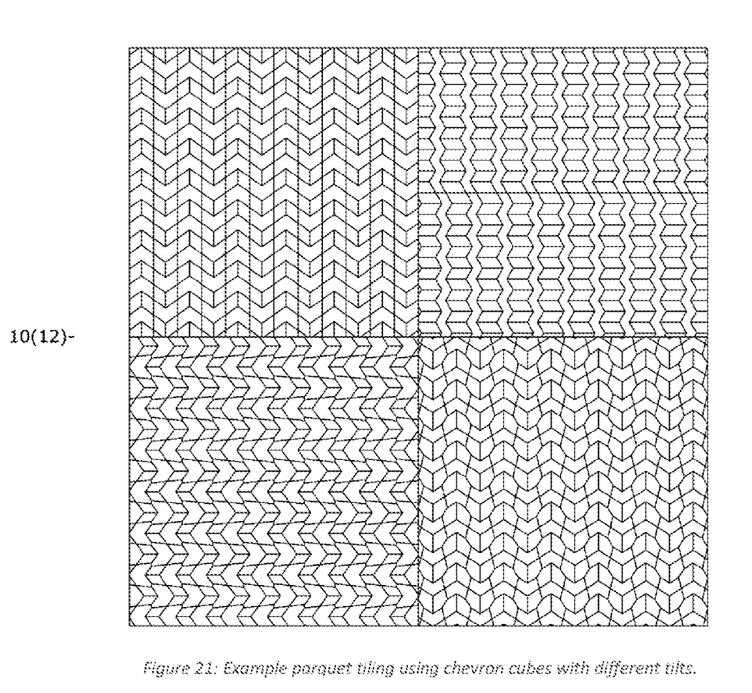
FIG. 21 is a diagram of an exemplary sheet of a retroreflective structure with parquet tiling using chevron cubes with different tilts.
Figure 22:
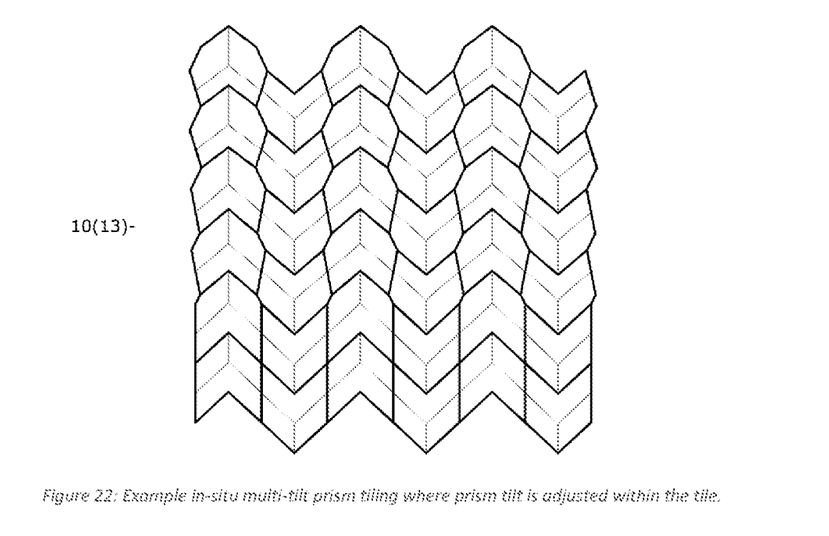
FIG. 22 is a diagram of an exemplary sheet of a retroreflective structure with tilts varying in-situ.

Referring to FIGS. 17-21, for manufacturing and performance purposes various rotations and tilings for other exemplary retroreflective structures 10(8)-10(13) are illustrated. For example, as shown in FIG. 17, chevron shaped prisms 12(3) may be tiled "in-situ" at 0° and 90° orientation of exemplary retroreflective structure 10(8) as part of the prism machining process. Alternatively, individual prism plates 18(1)-18(4) may be fabricated and then parqueted together to form the sheet for the exemplary retroreflective structure 10(9) as illustrated in FIG. 18. In another example, both methods may be combined by parqueting in-situ tiled prisms to form the sheet for the exemplary retroreflective structure 10(10) as shown in FIG. 19. In yet another example, prism tiling need not be constrained to the 0° and 90° orientation and may have varying orientation angles to form the sheet for the exemplary retroreflective structure 10(11) as shown in FIG. 20. Further, in another example different prism tilts and even different prism types may be tiled to form the sheet for the exemplary retroreflective structure 10(12) as shown in FIG. 21. Furthermore, in exemplary retroreflective structure 10(13) illustrated in FIG. 22, the tilt of individual prisms within a tile may advantageously be varied in-situ, such that the array of prisms will contain more than one tilt prescription. In this way, an additional design degree of freedom may be applied to optimize the performance of the prism array. As adjusting the tilt will change the individual prism aperture shape within the array there will be myriads of possible prism tilings available. Such tilings may be selected to optimize for the machining technology of choice or may be selected to maximize active area or may be selected to produce a preferred cosmetic appearance or other criteria.

The examples illustrated and described above are illustrative and various other permutations of these examples may be applied. Additionally, other examples of the claimed technology may have other prism geometries, tiling and/or rotation permutations. Further, a variety of different types of manufacturing processes to form these prisms may be used, such as flycutting, microchiseling, milling, pin bundling and/or lithographic processing by way of example.

Accordingly, as illustrated and described by way of the example herein, examples of this technology provide improved and customizable retroreflective structures. With example of this technology, a projected polygonal aperture shape of at least one of the prisms is concave with at least one interior angle of the projected aperture polygon being greater than 180°. Additionally, examples of this technology may advantageously be configured with different: shapes, such as truncated cubes, rectangular cubes, chevron cubes, or stretched chevron cubes; sizes, such as between 25 μm to 500 μm; directions, such as unidirectional, bidirectional, or a combination thereof; tilts, such as over the range of −20° to +20°; apex center locations; and/or tiling, such as in-situ, parquet, or a combination thereof to further customize optical retroreflective performance.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A retroreflector structure comprising
   a plurality of cornercube prisms in a sheet; and
   a projected aperture of at least one of the cornercube prisms comprising: facets which each extend continuously along only one plane from each intersection of the facets in the projection aperture to a projection aperture entrance; and a concave polygon shape with at least one interior angle greater than 180°.

2. The structure as set forth in claim 1 further comprising: a tilt of a cube axis of each of the cornercube prisms with respect to a normal of a plane extending along the sheet is between −20° to +20°.

3. The structure as set forth in claim 2 wherein the tilt is about +9.8°.

4. The structure as set forth in claim 1 further comprising a dihedral angle deviation of each of the facets of at least the one of the cornercube prisms is within ±1° of each other.

5. The structure as set forth in claim 1 wherein the projected aperture of the at least one of the cornercube prisms further comprises a chevron shape.

6. The structure as set forth in claim 5 wherein one dimension of the chevron shape is elongated with respect to other dimensions of the chevron shape.

7. The structure as set forth in claim 1 wherein each of the cornercube prisms has the same orientation.

8. The structure as set forth in claim 1 wherein the sheet comprises at least one of a unidirectional arrangement or a bidirectional arrangement of the cornercube prisms.

9. The structure as set forth in claim 8 wherein a cube axis of each of the cornercube prisms with respect to a normal of a plane extending along the sheet is between −20° to +20°.

10. The structure as set forth in claim 8 wherein a cube apex of each of the cornercube prisms is off center.

11. The structure as set forth in claim 1 wherein the sheet comprises a plurality of tiles each comprising a plurality of the cornercube prisms, wherein the tiles are in alternating angular orientations.

12. The structure as set forth in claim 11 wherein the plurality of tiles on the sheet are at least partially formed in-situ.

13. The structure as set forth in claim 11 wherein the plurality of tiles on the sheet are at least partially parqueted together.

14. The structure as set forth in claim 1 wherein the cornercube prisms have a prism pitch range between 25 μm to 500 μm.

15. The structure as set forth in claim 1 wherein the sheet comprises a plurality of tiles each comprising a plurality of the cornercube prisms, wherein within one or more of the tiles a tilt of a cube axis of two or more of the cornercube prisms with respect to a normal of a plane extending along the sheet are different from each other.

16. A method for making a retroreflector structure, the method comprising:
providing a sheet for the retroreflector structure;
forming a plurality of cornercube prisms in the sheet, wherein the forming further comprises forming a projected aperture of at least one of the cornercube prisms to comprise: facets which each extend continuously along one plane from each intersection of the facets in the projection aperture to a projection aperture entrance; and a concave polygon shape with at least one interior angle greater than 180°.

17. The method as set forth in claim 16 further comprising:
a tilt of a cube axis of each of the cornercube prisms with respect to a normal of a plane extending along the sheet is between −20° to +20°.

18. The method as set forth in claim 17 wherein the tilt is about +9.8°.

19. The method as set forth in claim 16 further comprising a dihedral angle deviation of each of the facets of at least the one of the cornercube prisms is within ±1° of each other.

20. The method as set forth in claim 16 wherein the projected aperture of the at least one of the cornercube prisms further comprises a chevron shape.

21. The method as set forth in claim 20 wherein one dimension of the chevron shape is elongated with respect to other dimensions of the chevron shape.

22. The method as set forth in claim 16 wherein each of the cornercube prisms has the same orientation.

23. The method as set forth in claim 16 wherein the sheet comprises at least one of a unidirectional arrangement or a bidirectional arrangement of the cornercube prisms.

24. The method as set forth in claim 23 wherein a cube axis of each of the cornercube prisms with respect to a normal of a plane extending along the sheet is between −20° to +20°.

25. The method as set forth in claim 23 wherein a cube apex of each of the cornercube prisms is off center.

26. The method as set forth in claim 16 wherein the sheet comprises a plurality of tiles each comprising a plurality of the cornercube prisms, wherein the tiles are in alternating angular orientations.

27. The method as set forth in claim 26 wherein the plurality of tiles on the sheet are at least partially formed in-situ.

28. The method as set forth in claim 26 wherein the plurality of tiles on the sheet are at least partially parqueted together.

29. The method as set forth in claim 16 wherein the cornercube prisms have a prism pitch range between 25 μm to 500 μm.

30. The method as set forth in claim 16 wherein the sheet comprises a plurality of tiles each comprising a plurality of the cornercube prisms, wherein within one or more of the tiles a tilt of a cube axis of two or more of the cornercube prisms with respect to a normal of a plane extending along the sheet are different from each other.

* * * * *